United States Patent
Wang et al.

(10) Patent No.: US 8,730,996 B2
(45) Date of Patent: May 20, 2014

(54) METHOD AND DEVICE FOR REESTABLISHMENT AT PACKET DATA CONVERGENCE PROTOCOL LAYER

(75) Inventors: Bo Wang, Shenzhen (CN); Xiaoan Hou, Shenzhen (CN); Delong Tang, Shenzhen (CN); Miao Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 325 days.

(21) Appl. No.: 13/258,621

(22) PCT Filed: Mar. 23, 2010

(86) PCT No.: PCT/CN2010/071221
§ 371 (c)(1),
(2), (4) Date: Nov. 8, 2011

(87) PCT Pub. No.: WO2010/142157
PCT Pub. Date: Dec. 16, 2010

(65) Prior Publication Data
US 2012/0057546 A1    Mar. 8, 2012

(30) Foreign Application Priority Data

Jun. 10, 2009    (CN) .......................... 2009 1 0203747

(51) Int. Cl.
*H04J 3/16*    (2006.01)
*H04J 3/22*    (2006.01)
*H04J 3/24*    (2006.01)
*H04W 36/00*    (2009.01)

(52) U.S. Cl.
USPC ........................... 370/466; 370/474; 455/436

(58) Field of Classification Search
USPC ................... 370/328–338, 465–474
See application file for complete search history.

(56) References Cited

U.S. PATENT DOCUMENTS

2001/0043577 A1 *  11/2001  Barany et al. ................. 370/328

(Continued)

FOREIGN PATENT DOCUMENTS

CN    101309128 A    11/2008

(Continued)

OTHER PUBLICATIONS

3rd Generation Partnership Project; Technical Specification Group Radio Access Network; Evolved Universal Terrestrial Radio Access (E-UTRA); Packet Data Convergence Protocol (PDCP) specification (Release 8), Mar. 2009, 3GPP TS 36.323 V8.5.0.

(Continued)

*Primary Examiner* — Xavier Szewai Wong
(74) *Attorney, Agent, or Firm* — Oppedahl Patent Law Firm LLC

(57) ABSTRACT

The present invention discloses a method and device for reestablishment at packet data convergence protocol (PDCP) layer. On the receiving side of the PDCP layer, the method comprises: clearing resident control messages (501); processing resident service messages, and clearing feedback information generated during processing (502); and resetting a decompressor, and updating configuration of a decryption module (503). On the transmitting side of the PDCP layer, the method comprises: resetting a compressor, and updating configuration of an encryption module; clearing the resident control messages; and reprocessing the resident service messages. With the differentiated processing for the resident messages at the PDCP layer during the reestablishment, the present invention can avoid the abnormal mode switching of the compressor, and accelerate the user plane restoration after the reestablishment. The present invention can further avoid the transmission of invalid feedback, thus improving the utilization of air interface resources; meanwhile, by avoiding the influence of the invalid status report on uplink and downlink transmission policies, the present invention can reduce retransmission of the service messages, thus improving the utilization of air interface resources.

6 Claims, 5 Drawing Sheets

(56) References Cited

U.S. PATENT DOCUMENTS

| | | | |
|---|---|---|---|
| 2003/0177437 A1 | 9/2003 | Wu | |
| 2007/0110101 A1* | 5/2007 | Wu | 370/469 |
| 2008/0069142 A1 | 3/2008 | Wu | |
| 2008/0123655 A1* | 5/2008 | Kim et al. | 370/394 |
| 2009/0104890 A1* | 4/2009 | Wang et al. | 455/410 |
| 2010/0074168 A1* | 3/2010 | Wu | 370/328 |

FOREIGN PATENT DOCUMENTS

| | | | |
|---|---|---|---|
| JP | 2010541485 A | 12/2010 | |
| TW | M357138 U | 5/2009 | |

OTHER PUBLICATIONS

ZTE, handling of PDCP control PDUs upon PDCP re-establishment, 3GPP TSG-RAN2 #66bis, 3GPP, Jul. 3, 2009, R2-093880.

Vice Chairman, Report of E-UTRA user plane session, 3GPP TSG-RAN WG2#66bis, 3GPP, Jul. 3, 2009, R2-094049.

International Search Report in international application No. PCT/CN2010/071221, mailed on Jul. 1, 2010.

English Translation of the Written Opinion of the International Search Authority in international application No. PCT/CN2010/071221, mailed on Jul. 1, 2010.

* cited by examiner

METHOD AND DEVICE FOR REESTABLISHMENT AT PACKET DATA CONVERGENCE PROTOCOL LAYER

TECHNICAL FIELD

The present invention relates to the field of mobile communications, particularly to a method and a device for reestablishment at a Packet Data Convergence Protocol (PDCP) layer in a Long Term Evolution (LTE) system.

BACKGROUND

The PDCP layer is above a Radio Link Control (RLC) layer in a radio interface protocol stack of the LTE, its entity function is as shown in FIG. 1. An RLC entity to which the PDCP corresponds may be either in an Unacknowledged Mode (UM) or an Acknowledged Mode (AM). For easy description, the PDCP layer/entity here corresponding to the RLC layer AM/UM is called an AM/UM-type PDCP layer/entity. A PDCP reestablishment procedure refers to a PDCP entity resetting procedure instructed by an upper layer. There are many reasons for triggering PDCP reestablishment, such as switching, or RRC link reconfiguration. This application concerns a reestablishment procedure with regard to Data Radio Bearer (DRB). During the reestablishment, a series of related processes such as the processing of resident messages at the PDCP layer and the update of a security configuration are involved and the resetting of a Robust Header Compression (ROHC) module may be triggered. After the PDCP reestablishment, a Status Report generated according to an actual reception condition of messages is transmitted to an opposite end, so as to achieve the purpose of reducing retransmission of messages and saving air interface bandwidths. Below related background arts of the ROHC and the status report are introduced.

The ROHC provides header compression and decompression functions for a service message at the PDCP layer. The header compression refers to compressing redundant information in a header of a service message, such as an IP, a User Datagram Protocol (UDP), a Real-time Transport Protocol (RTP), and restoring the complete header at a receiving end, so as to achieve the purpose of saving air interface bandwidths. With regard to a service with a short message deadload length, such as Voice over IP (VOIP), the system gain obtained after the adoption of the header compression is significant. The position of the ROHC in the PDCP message processing is shown in FIG. 1. The ROHC module corresponding to a PDCP transmitting entity is called a compressor, and the one corresponding to a receiving entity is called a decompressor. The ROHC has three operating modes including a Unidirectional Mode (U-Mode), a Bi-directional Optimistic Mode (O-Mode), and a Bi-directional Reliable Mode (R-Mode). In the U-Mode, messages are transmitted in one direction only, that is compressor->decompressor. The U-Mode does not have a feedback mechanism. The compressor is always started in the U-mode, and then shifted to another mode when receiving a feedback message carrying mode information from the decompressor. In the O-Mode, the decompressor has a feedback channel via which feedback messages are transmitted, therefore being capable of informing the compressor of the feedback information in time. The compressor adjusts a compression policy and the type of transmitted packets in time according to the received feedback information. In the R-Mode, the feedback channel is used frequently to enhance system robustness, and the certainty of messages to the compressor relies on the feedback information sent back by the decompressor.

A model of the feedback mechanism is shown in FIG. 2. The compressor transmits compressed messages via an ROHC channel. While receiving and processing a compressed message, the decompressor generates feedback information. The feedback information is then transmitted to the compressor via the feedback channel. The feedback mechanisms of O-Mode and R-Mode are mainly classified into two types, including Interspersed Feedback and Piggybacked Feedback, according to transmission manners. The former adopts an interspersed feedback message transmitted on a channel. As for the PDCP, such interspersed feedback message is encapsulated into a feedback-type control message (i.e. Control PDU) at the PDCP layer and transmitted via an air interface. The Piggybacked feedback is embedded into a reverse ROHC compressed message and transmitted, such feedback is invisible to the PDCP. In an embodiment of the present invention, it exclusively refers to the feedback mechanism of the interspersed feedback. Both interspersed feedback and piggybacked feedback carry decompressed information of the decompressor for informing the compressor whether the compressed message is successfully decompressed, and may trigger the transition of an operating mode and operating state of the compressor. It should be noted that mode switching of the ROHC is always initiated by the decompressor, and mode switching of the compressor is triggered through transmitting a feedback carrying mode information.

The flow of processing a feedback message at the PDCP layer is shown in FIG. 3. The processing on the receiving side is: 1. receiving: a feedback-type control message transmitted by the PDCP on an opposite end is received; 2. parsing: a PDCP packet header is removed and feedback information is delivered to the compressor; 3. processing: the compressor carries out mode switching, state transition, adjustment of a packaging policy and other operations according to the feedback information. The processing on the transmitting side is: 1. generating: the decompressor decompresses a service message and generates feedback information; 2. encapsulating: the feedback information is encapsulated into a control message (i.e. CTRL PDU) by the transmitting side; 3. transmitting: the control message carrying the feedback information is delivered to a lower layer and transmitted to the opposite end via an air interface.

The status report is a PDCP control message carrying an actual reception condition of service messages and is applied to a PDCP reestablishment process of the DRB mapped to the AM mode. In the status report, there are bit sequences. A series of messages starting from the first lost message during reestablishment correspond to the sequences one to one. These bit sequences are called bitmaps. Each packet has a corresponding bit, 1 meaning received and 0 meaning lost. The status report is always generated by a receiving entity during the reestablishment and transmitted to an opposite transmitting entity via a reverse transmission channel. After the transmitting entity receives the report, it will adjust a local message transmission policy according to bitmap information, and will not transmit the messages that have been acknowledged in the status report, so as to save air interface resources. If a radio bearer is configured so that it can transmit a status report, then during the reestablishment procedure, a PDCP entity on the receiving side generates a status report according to an actual reception condition of the service messages and transmit it as the first message after the reestablishment. The generation and processing procedures of the status report also include a message receiving processing procedure and a message transmitting processing procedure, as shown in FIG. 4, which are similar to those of a feedback, therefore not be further described here.

When a reestablishment occurs, message reception and transmission at an air interface stop, and the PDCP entity begins to process resident messages at the current layer.

The existing processing method is:

On the local receiving side:

a) taking out a resident PDCP Data Protocol Data Unit (PDU), and performing unpacking, decryption, and decompression sequentially to generate a PDCP Service Data Unit (SDU);

b) with regard to a PDCP entity corresponding to an RLC UM c) for a UM-type PDCP entity, delivering the PDCP SDU to an upper layer; for an AM-type PDCP entity, delivering PDCP SDUs with continuous serial numbers (SN) to an upper layer, and caching PDCP SDUs with message cavity, i.e. with discontinuous SNs, and processing it after reestablishment; for a base station, the upper layer here typically refers to a GPRS Tunnelling Protocol for User Plane (GTP-U) layer; and for a terminal, the upper layer here typically refers to an application layer.

d) repeating steps a) and b) until all the resident messages (PDCP Data PDU) on the receiving side are processed;

e) updating a security configuration of a decryption module (such as changing a password), and resetting a decompressor so as to return to the initial state and operating mode.

On the local transmitting side:

a) updating a security configuration of an encryption module (such as changing a password), and updating a compressor so as to return to the initial state and operating mode;

b) re-compressing and re-encrypting an SDU, which is not successfully transmitted but has been allocated with an SN, by the reset compressor and encryptor to generate a new Data PDU;

c) delivering the newly generated PDU instead of a resident Data PDU to a lower layer (i.e. an RLC protocol layer);

d) processing SDUs in ascending SN order; and repeating steps b) and c) until all the resident messages on the transmitting side are processed.

The problem of this solution is that it fails to process resident control messages (Feedback and Status Report) at a PDCP layer during reestablishment.

Feedback messages generated during a reestablishment procedure or feedback messages residing at a PDCP layer may become invalid. According to generation reasons, three types of invalid feedback messages will occur during reestablishment:

Type 1: feedback-type control messages residing in a PDCP receiving buffer;

Type 2: feedback messages generated when service messages residing in a receiving buffer are processed before a decompressor is reset; and Type 3: feedback-type control messages residing in a PDCP transmitting buffer.

During PDCP reestablishment, ROHC resetting is triggered, that is the compressor/decompressor restarts work from the initial state and operating mode. Therefore, information in feedback messages of Type 1 is out of date, and is useless to the local compressor. Feedback messages of Type 2 and Type 3 are transmitted to an opposite compressor in a normal process. The reestablishment is synchronous with respect to an E-UTRAN Node B (eNB) side and a User Equipment (UE) side, and the opposite compressor is also reset at the same time. Therefore, feedback messages of Type 2 and Type 3 are also invalid information. During the ROHC resetting, a new context is established. If allocated Context IDs (CID) are consistent with those in these feedback messages, then after the opposite compressor receives a feedback message of Type 2 or 3, it may enter mode switching and other abnormal processes without being known by the decompressor. On the other hand, the transmission of these invalid feedback messages after reestablishment causes a waste of air interface resources. Particularly, before reestablishment, the ROHC works in the R-Mode and the number of feedback messages is rather large, so the invalid feedback messages after the reestablishment may cause even more significant waste of resources.

During the reestablishment, resident status reports at the PDCP layer become invalid. The status reports are classified into two types according to generation locations:

Type 1: resident status report-type control messages in a PDCP reception buffer; and Type 2: resident status report-type control messages in a PDCP transmission buffer.

A status report of Type 1 may influence the transmission policy of local messages. The status report typically is the first packet of messages received after reestablishment. If a status report appears in a PDCP resident message during the reestablishment, then it corresponds to the last reestablishment, wherein the reception information contained in the status report is out of date. The reception information contained in the status report of Type 1 can not reflect an actual reception condition on an opposite side in real time, which may cause retransmission of messages. A status report of Type 2 is transmitted to an opposite end. Similar to the status report of Type 1, it may influence the transmission efficiency of the messages on the opposite end.

In a word, the existing technical solution for processing resident messages during PDCP reestablishment fails to process feedback messages or status reports. Invalid feedback messages may result in a waste of air interface resources and even may make a compressor enter mode switching and other abnormal processes without being known by a decompressor, which results in a delay in processing of normal service data after the reestablishment. The out-of-date information included in invalid status reports influence the transmission policy of uplink and downlink messages, thereby resulting in message retransmission which leads to the reduction of the utilization of air interface resources.

SUMMARY

One technical problem the present invention intends to solve is to provide a method and a device for reestablishment at a PDCP layer to avoid the transmission of invalid feedback messages which wastes air interface resources and causes a compressor to enter mode switching and other abnormal processes without being known by a decompressor.

Another technical problem the present invention intends to solve is to avoid the transmission of invalid status reports which affects the transmission policy of uplink and downlink messages and reduces the utilization of air interface resources.

To solve the foregoing technical problems, the present invention provides a method for reestablishment at a PDCP layer, on a receiving side of the PDCP layer, the method may comprise:

clearing resident control messages;

processing resident service messages, and clearing feedback information generated during the processing; and resetting a decompressor, and updating configuration of a decryption module; and on a transmitting side of the PDCP layer, the method comprises:

resetting a compressor, and updating a configuration of an encryption module;

clearing resident control messages; and reprocessing resident service messages.

The method may further have the following features:

if an RLC layer to which the PDCP layer corresponds is in a UM, the step of clearing resident control messages on the receiving side of the PDCP layer is clearing resident feedback-type control messages; and the step of clearing resident control messages on the transmitting side of the PDCP layer is clearing resident feedback-type control messages.

The method may further have the following features:

if an RLC layer to which the PDCP layer corresponds is in an AM, the step of clearing resident control messages on the receiving side of the PDCP layer is clearing resident feedback-type control messages and status report-type control messages; and the step of clearing resident control messages on the transmitting side of the PDCP layer is clearing resident feedback-type control messages and status report-type control messages.

In order to solve the foregoing technical problems, the present invention provides a method for reestablishment at a PDCP layer, which is applied to a receiving side of the PDCP layer, the method comprises:

clearing resident control messages;

processing resident service messages, and clearing feedback information generated during the processing; and resetting a decompressor, and updating a configuration of a decryption module.

The method may further comprise: if an RLC layer to which the PDCP layer corresponds is in a UM, resident messages on the receiving side are classified before the step of clearing resident control messages, and feedback-type control messages are discarded in the step of clearing resident control messages;

in the step of processing resident service messages, the resident service messages are unpacked, decrypted and decompressed to generate a PDCP SDU, and the SDU is delivered to an upper layer; and feedback information generated during the processing of the service messages is discarded in the step of clearing feedback information generated during the processing; and a security configuration of the decryption module is updated in the step of updating a configuration of a decryption module.

The method may further comprise: if an RLC layer to which the PDCP layer corresponds is in an AM, resident messages on the receiving side are classified before the step of clearing resident control messages, and feedback-type control messages and status report-type control messages are discarded in the step of clearing resident control messages;

in the step of processing resident service messages, the resident service messages are unpacked, decrypted and decompressed to generate a PDCP SDU, PDCP SDUs with continuous SNs are transmitted to an upper layer, and PDCP SDUs with discontinuous SNs are cached and not processed until the reestablishment is finished; and feedback information generated during the processing of the service messages is discarded in step of clearing feedback information generated during the processing; and a security configuration of the decryption module is updated in the step of updating a configuration of a decryption module.

In order to solve the foregoing technical problems, the present invention provides a method for reestablishment at a PDCP layer, which is applied to a transmitting side of the PDCP layer, the method comprises:

resetting a compressor, and updating a configuration of an encryption module;

clearing resident control messages; and reprocessing resident service messages.

The method may further comprise: if an RLC layer to which the PDCP layer corresponds is in a UM, resident messages on the transmitting side are classified before the step of clearing resident control messages, and feedback-type control messages are discarded in the step of clearing resident control messages; and in the step of reprocessing resident service messages, an SDU which is not successfully transmitted but has been allocated with an SN is allocated with a new SN starting from 0, the new SN is adapted to encapsulate a packet header, the reset compressor is used for recompression and the updated encryption module is used for re-encryption to generate a new PDU; the newly generated PDU is adapted to replace a resident Data PDU and delivered to a lower layer.

The method may further comprise: if an RLC layer to which the PDCP layer corresponds is in an AM, resident messages on the transmitting side are classified before the step of clearing resident control messages, and feedback-type control messages and status report-type control messages are discarded in the step of clearing resident control messages; and in the step of reprocessing resident service messages, for an SDU which is not successfully transmitted but has been allocated with an SN, an original SN is adapted to encapsulate a packet header, the reset compressor is used for recompression and the updated encryption module is used for re-encryption to generate a new PDU; and the newly generated PDU is adapted to replace a resident Data PDU and delivered to a lower layer.

In order to solve the foregoing technical problems, the present invention provides a device for reestablishment at a PDCP layer, which comprises a receiver and a transmitter, wherein, the receiver is configured to clear resident control messages during the reestablishment at the PDCP layer; process resident service messages and clear feedback information generated during the processing; and the transmitter is configured to clear resident control messages during the reestablishment at the PDCP layer.

The device may further have the following features:

if an RLC layer to which the PDCP layer corresponds is in a UM, the receiver is further configured to clear resident feedback-type control messages during the reestablishment at the PDCP layer; and The transmitter is further configured to clear resident feedback-type control messages during the reestablishment at the PDCP layer.

The device may further have the following features:

if an RLC layer to which the PDCP layer corresponds is in an AM, the receiver is further configured to clear resident feedback-type control messages and status report-type control messages during the reestablishment at the PDCP layer; and the transmitter is further configured to clear resident feedback-type control messages and status report-type control messages during the reestablishment at the PDCP layer.

In order to solve the foregoing technical problems, the present invention provides a receiver in a device for reestablishment at a PDCP layer, and the receiver is configured to clear resident control messages during the reestablishment at the PDCP layer, process resident service messages and clear feedback information generated during the processing.

The receiver may further have the following features:

if an RLC layer to which the PDCP layer corresponds is in a UM, during the reestablishment at the PDCP layer, the receiver is configured to classify resident messages, discard feedback-type control messages, unpack, decrypt and decompress resident service messages to generate a PDCP SDU, deliver the SDU to an upper layer, discard feedback information generated during processing of the service messages, and reset a decompressor and update a security configuration of a decryption module after processing of the resident messages is completed.

The receiver may further have the following features:

if an RLC layer to which the PDCP layer corresponds is in an AM, during the reestablishment at the PDCP layer, the receiver is configured to classify resident messages, discard feedback-type control messages and status report-type control messages, unpack, decrypt and decompress the resident service messages to generate a PDCP SDU, deliver PDCP SDUs with continuous SNs to an upper layer, cache PDCP SDUs with discontinuous SNs and not process them until the reestablishment is finished, discard feedback information generated during the processing of the service messages, and reset a decompressor and update a security configuration of a decryption module after processing of the resident messages is completed.

In order to solve the foregoing technical problems, the present invention provides a transmitter in a device for reestablishment at a PDCP layer, and the transmitter is configured to clear resident control messages during the reestablishment at the PDCP layer.

The transmitter may further have the following features:

if an RLC layer to which the PDCP layer corresponds is in a UM, during the reestablishment at the PDCP layer, the transmitter is configured to reset a compressor, update a configuration of an encryption module, classify resident messages, discard feedback-type control messages, allocate a new SN starting from 0 to an SDU which is not successfully transmitted but has been allocated with an SN, use the new SN to encapsulate a packet header, use the reset compressor to perform recompression and use the updated encryption module to perform re-encryption to generate a new PDU, and use the newly generated PDU to replace a resident Data PDU, and deliver it to a lower layer.

The transmitter may further have the following features:

if an RLC layer to which the PDCP layer corresponds is in an AM, during the reestablishment at the PDCP layer, the transmitter is configured to reset a compressor, update a configuration of an encryption module, classify resident messages, discard feedback-type control messages and status report-type control messages, use an original SN to encapsulate a packet header for an SDU which is not successfully transmitted but has been allocated with an SN, use the reset compressor to perform recompression and use the updated encryption module to perform re-encryption to generate a new PDU, and use the newly generated PDU to replace a resident Data PDU, and deliver it to a lower layer.

With the differentiated processing of resident messages at a PDCP layer during reestablishment, the present invention can avoid abnormal mode switching of a compressor, and accelerate the user plane restoration after the reestablishment. The present invention can further avoid the transmission of an invalid feedback, thus improving the utilization of air interface resources; meanwhile, by avoiding the influence of an invalid status report on uplink and downlink transmission policies, the present invention can reduce retransmission of service messages, thus improving the utilization of air interface resources.

DETAILED DESCRIPTION

An embodiment of the present invention provides an optimized method for reestablishment at a PDCP layer. Through clearing invalid control messages, abnormal mode switching of a compressor can be avoided, and user plane restoration after the reestablishment can be accelerated. Further, the present invention can avoid transmission of invalid feedbacks, thus improving the utilization of air interface resources. Meanwhile, by avoiding the influence of an invalid status report on uplink and downlink transmission policies, the present invention can reduce retransmission of service messages, and improve the utilization of air interface resources.

The present invention is described in detailed hereinafter in combination with the drawings and embodiments.

Figure 1:
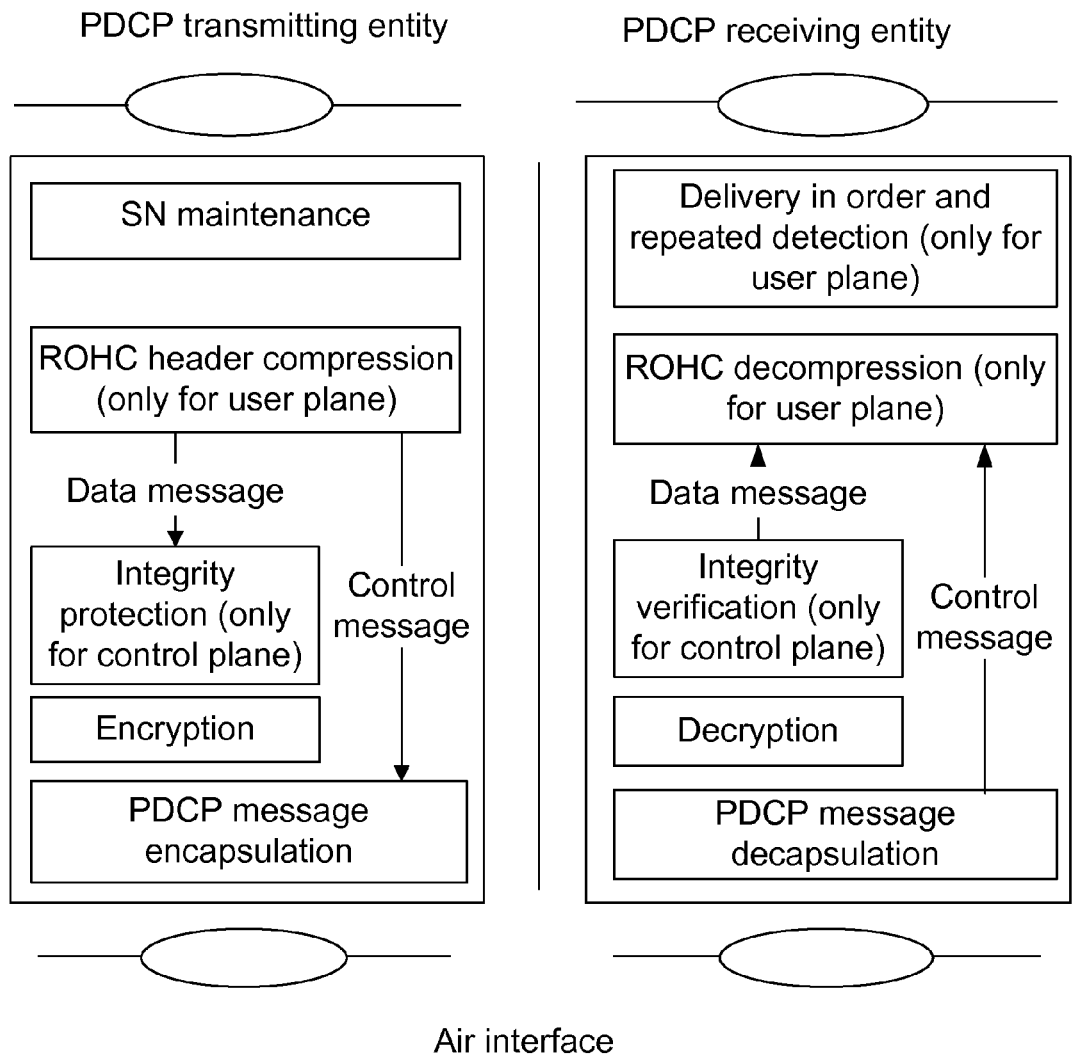
FIG. 1 is a diagram of a PDCP entity.
Figure 2:
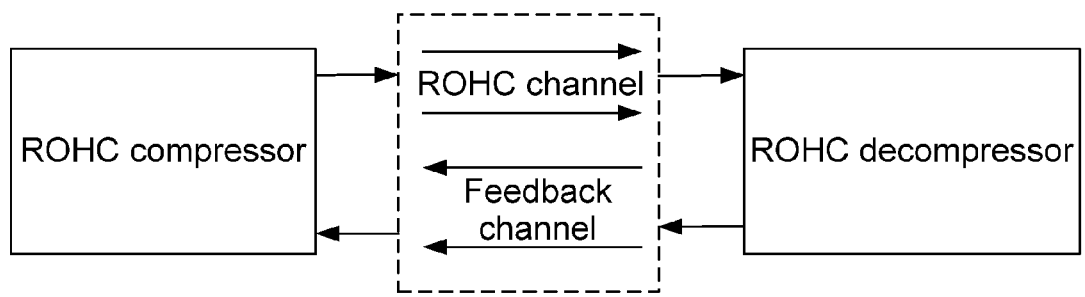
FIG. 2 is a diagram of an ROHC feedback mechanism.
Figure 3:
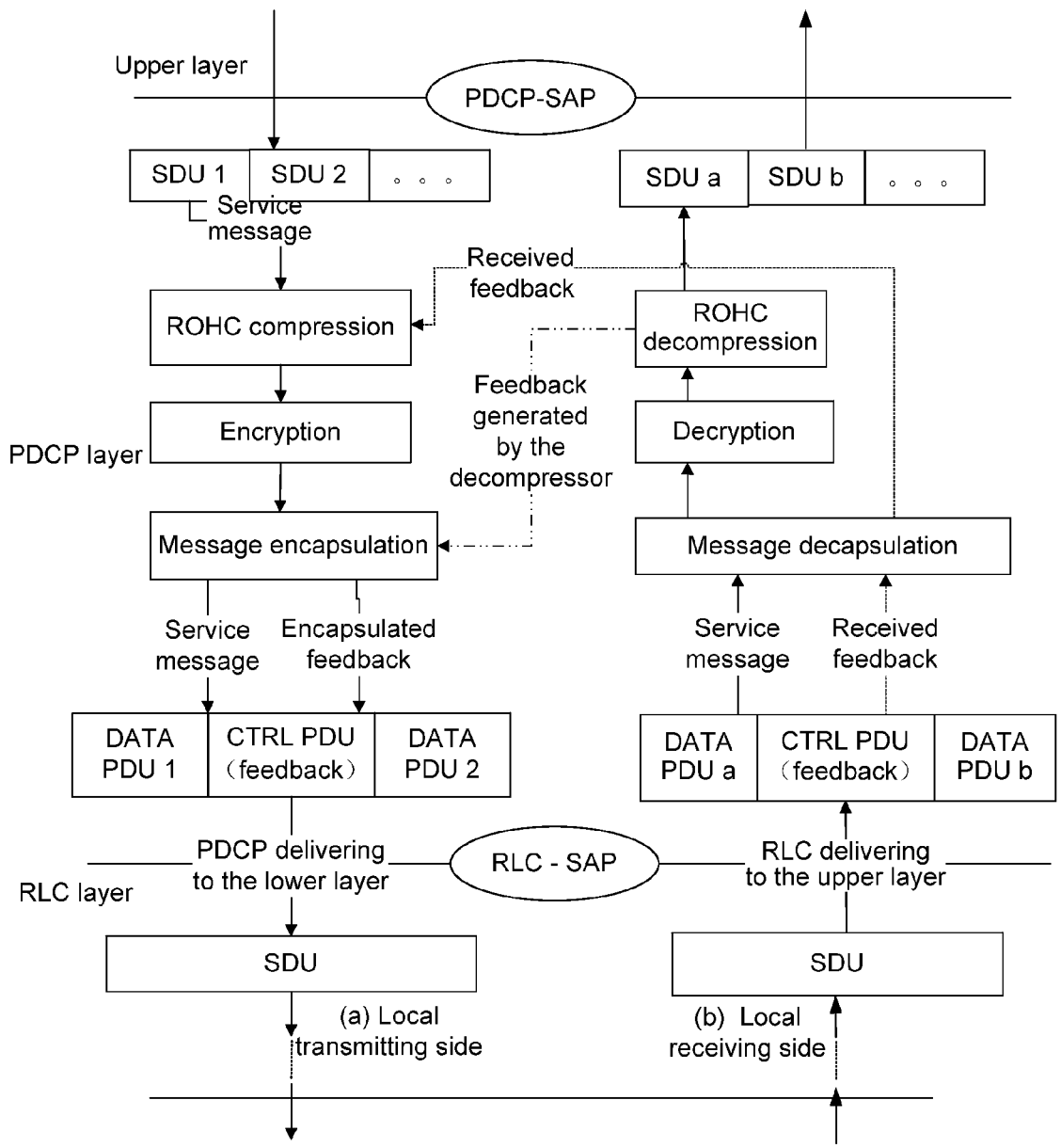
FIG. 3 is a diagram for processing a PDCP feedback.
Figure 4:
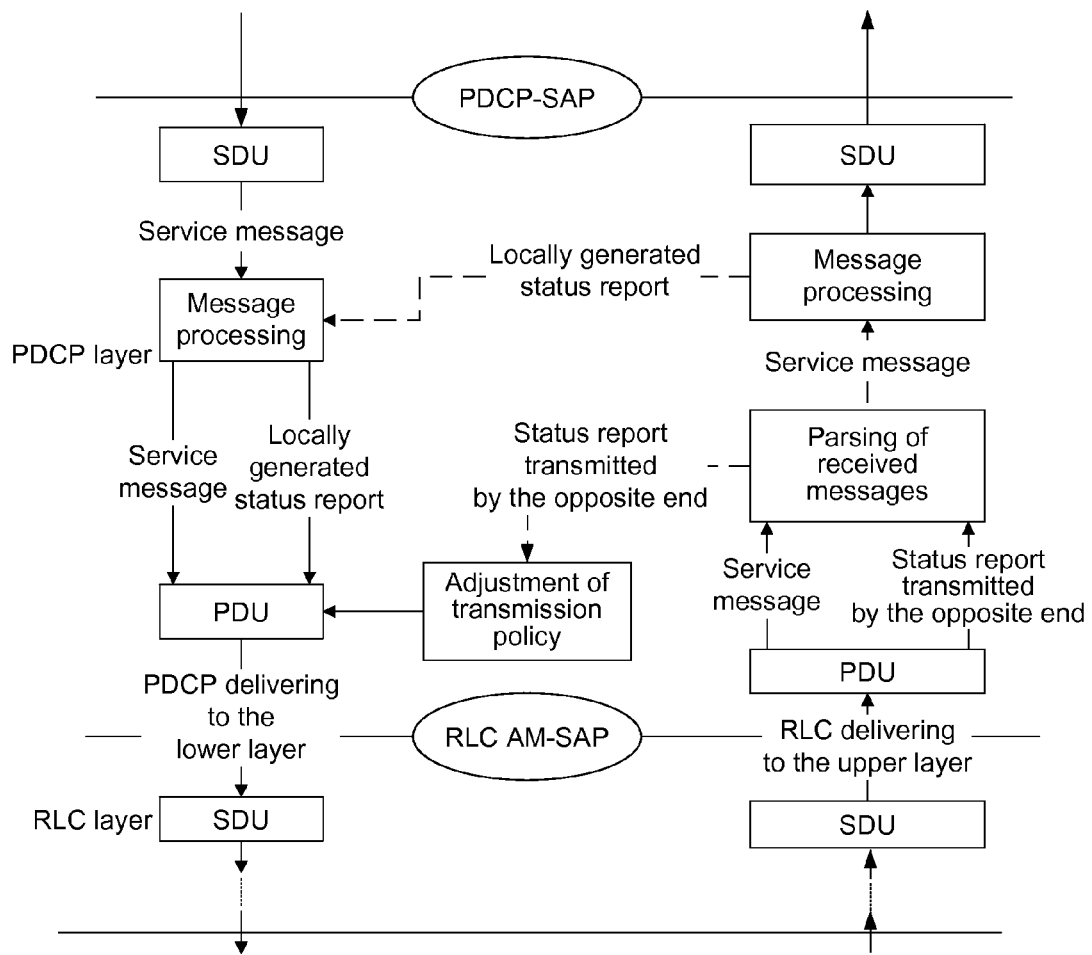
FIG. 4 is a diagram for processing a PDCP status report.
Figure 5:
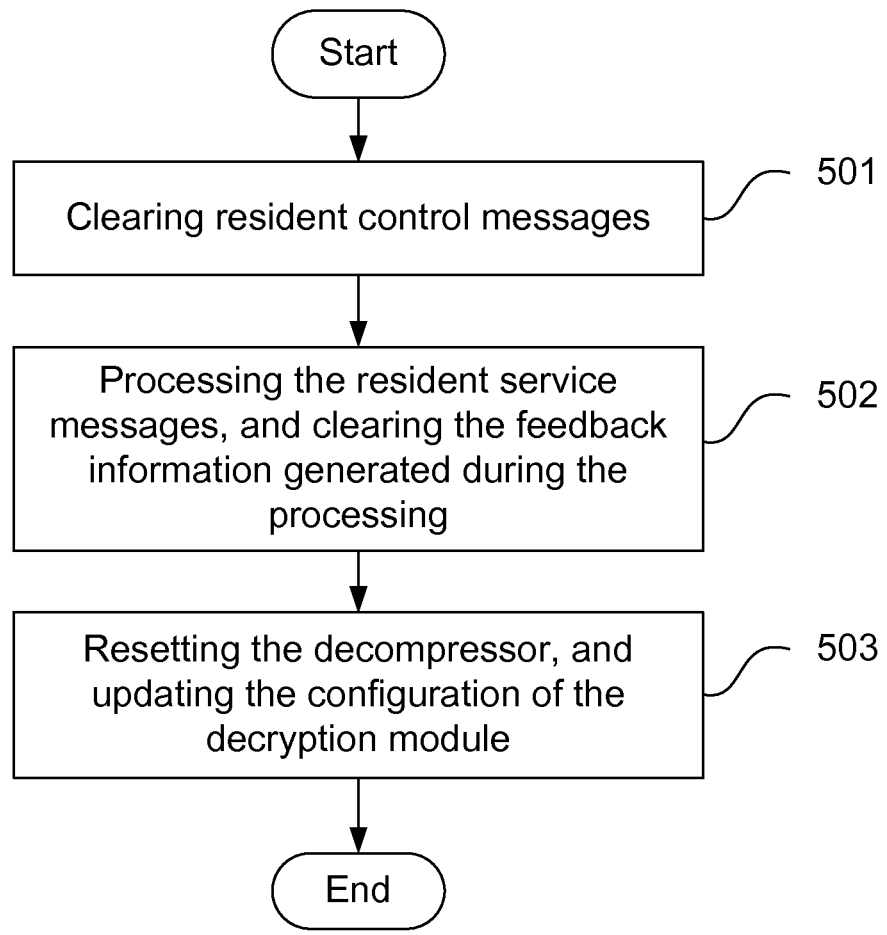
FIG. 5 is a flow chart of a receiving side of a PDCP entity according to an embodiment of the present invention.
Figure 6:
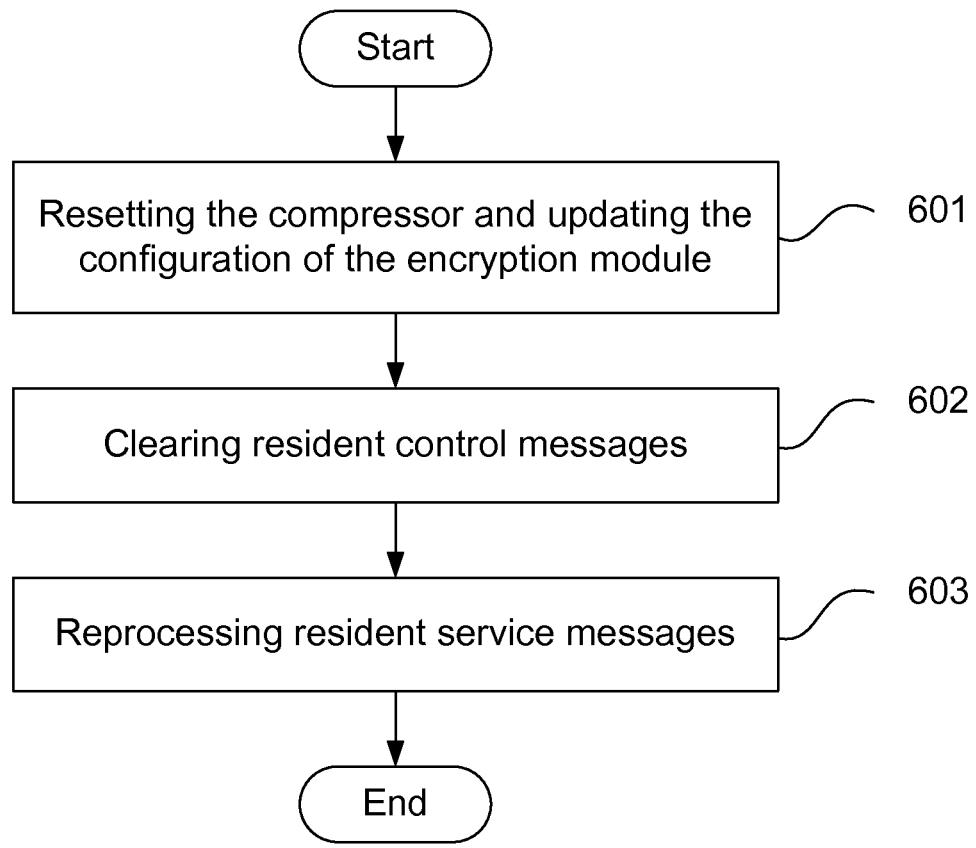
FIG. 6 is a flow chart of a transmitting side of a PDCP entity according to an embodiment of the present invention.

A method according to an embodiment of the present invention is shown in FIG. 5 and FIG. 6.

As shown in FIG. 5, on a receiving side (or called a receiver) of a PDCP layer, the method includes the following steps:

step 501: the receiving side clears resident control messages;

the control messages include at least feedback-type control messages (i.e. feedback messages), and may also include status report-type control messages (i.e. status reports);

specifically, if an RLC layer to which the PDCP layer corresponds is in a UM, the receiving side clears resident feedback-type control messages;

and, if an RLC layer to which the PDCP layer corresponds is in an AM, the receiving side clears resident feedback-type control messages and status report-type control messages;

step 502: the receiving side processes resident service messages, and clears feedback information generated during the processing; and step 503: the receiving side resets a decompressor, and updates a configuration of a decryption module.

On a transmitting side (or called a transmitter) of the PDCP layer, the method includes the following steps:

step 601: the transmitting side resets a compressor and updates a configuration of an encryption module;

step 602: the transmitting side clears resident control messages;

the control messages include at least feedback-type control messages (i.e. feedback messages), and may also include status report-type control messages (i.e. status reports);

specifically, if an RLC layer to which the PDCP layer corresponds is in a UM, the transmitting side clears resident feedback-type control messages;

and, if an RLC layer to which the PDCP layer corresponds is in an AM, the transmitting side clears resident feedback-type control messages and status report-type control messages; and step 603: the transmitting side reprocesses resident service messages.

As described in step 501-step 503, on the receiving side of the UM-type PDCP layer, the method specifically includes the following steps:

(1) during reestablishment at the UM-type PDCP layer, resident messages on the receiving side are classified, if they are feedback-type control messages, then they are discarded;

(2) resident service messages are unpacked, decrypted and decompressed to generate a PDCP SDU; and then the PDCP SDU is delivered to an upper layer;

(3) feedback information generated during the processing of the service messages in Step (2) is discarded so as to avoid being encapsulated into a Control PDU and transmitted to sn opposite end;

(4) steps (1)-(3) are repeated until all the resident messages on the receiving side are processed;

(5) a security configuration of the decryption module is updated (such as changing a password) and the decompressor is reset so as to return to the initial state and operating mode.

As described in step 601-step 603, on the transmitting side of the UM-type PDCP layer, the method specifically includes the following steps:

(a) during reestablishment at the UM-type PDCP layer, a configuration of the encryption module is updated, and the compressor is reset so as to return to the initial state and operating mode;

(b) resident messages on the transmitting side are classified, if they are feedback-type control messages, then they are discarded and not delivered to a lower layer;

(c) an SDU which is not successfully transmitted but has been allocated with an SN is allocated with a new SN starting from 0, the new SN is adapted to encapsulate the packet header, the reset compressor and encryption module are used for recompression and re-encryption to generate a new PDU; and the newly generated PDU is adapted to replace a resident Data PDU and delivered to a lower layer; and (d) steps (a)-(c) are repeated until all the resident messages on the transmitting side are processed.

As described in step 501-step 503, on the receiving side of the AM-type PDCP layer, the method specifically includes the following steps:

(I) during reestablishment at the AM-type PDCP layer, resident messages on the receiving side are classified; if they are feedback-type control messages or status report-type control messages, they are discarded;

(II) resident service messages are unpacked, decrypted and decompressed to generate a PDCP SDU, the PDCP SDUs with continuous SNs are delivered to an upper layer, and the PDCP SDUs with message cavity, i.e. with discontinuous SNs, are cached and not processed until the reestablishment is finished;

(III) feedback information generated during the processing of the service messages in step (II) are discarded so as to avoid being encapsulated into a Control PDU and transmitted to an opposite end;

(IV) steps (I)-(III) are repeated until all the resident messages on the receiving side are processed; and (V) a security configuration of the decryption module is updated (such as changing a password) and the decompressor is reset so as to return to the initial state and operating mode.

As described in step 601-step 603, on the transmitting side of the AM-type PDCP layer, the method specifically includes the following steps:

(A) during reestablishment at the AM-type PDCP layer, a configuration of the encryption module on the transmitting side is updated, and the compressor is reset so as to return to the initial state and operating mode;

(B) resident messages on the transmitting side are classified, if they are feedback-type control messages or status report-type control messages, then they are discarded and not delivered to a lower layer;

(C) for an SDU which is not successfully transmitted but has been allocated with a SN, an original SN is adapted to encapsulate a packet header, the reset compressor and the updated encryption module are used for recompression and re-encryption to generate a new PDU; and the newly generated PDU is adapted to replace a resident Data PDU and delivered to a lower layer; and (D) steps (A)-(C) are repeated until all the resident messages on the transmitting side are processed.

A device for reestablishment at a PDCP layer according to an embodiment of the present invention comprises a receiver and a transmitter, wherein, the receiver is adapted to clear resident control messages during the reestablishment at the PDCP layer and process resident service messages and clear feedback information generated during the processing; and the transmitter is adapted to clear resident control messages during the reestablishment at the PDCP layer.

If an RLC layer to which the PDCP layer corresponds is in a UM, the receiver is further adapted to clear resident feedback-type control messages during the reestablishment at the PDCP layer; and the transmitter is further adapted to clear resident feedback-type control messages during the reestablishment at the PDCP layer.

If an RLC layer to which the PDCP layer corresponds is in an AM, the receiver is further adapted to clear resident feedback-type control messages and status report-type control messages during the reestablishment at the PDCP layer; and the transmitter is further adapted to clear resident feedback-type control messages and status report-type control messages during the reestablishment at the PDCP layer.

If an RLC layer to which the PDCP layer corresponds is in a UM, the receiver is further adapted to, during the reestablishment at the PDCP layer, classify resident messages, discard feedback-type control messages, unpack, decrypt and decompress resident service messages to generate a PDCP SDU, deliver the SDU to an upper layer, discard feedback information generated during the processing of the service messages, and reset a decompressor and update a security configuration of a decryption module after the processing of the resident messages is completed.

If an RLC layer to which the PDCP layer corresponds is in an AM, the receiver is further adapted to, during the reestablishment at the PDCP layer, classify resident messages, discard feedback-type control messages and status report-type control messages, unpack, decrypt and decompress resident service messages to generate a PDCP SDU, deliver the PDCP SDUs with continuous SNs to an upper layer, cache the PDCP SDUs with discontinuous SNs and not process them until the reestablishment is finished, discard feedback information generated during the processing of the service messages, and reset the decompressor and update a security configuration of the decryption module after the processing of the resident messages is completed.

If an RLC layer to which the PDCP layer corresponds is in a UM, the transmitter is further adapted to, during the reestablishment at the PDCP layer, reset a compressor, update a configuration of an encryption module, classify resident messages, discard feedback-type control messages, allocate a new SN starting from 0 to an SDU which is not successfully transmitted but has been allocated with an SN, use the new SN to encapsulate a packet header, use the reset compressor to perform recompression, use the updated encryption module to perform re-encryption to generate a new PDU; and use the newly generated PDU to replace a resident Data PDU, and deliver it to a lower layer.

If an RLC layer to which the PDCP layer corresponds is in an AM, the transmitter is further adapted to, during the reestablishment at the PDCP layer, reset the compressor, update a configuration of the encryption module, classify resident messages, discard feedback-type control messages and status report-type control messages, use an original SN to encapsulate a packet header for an SDU which is not successfully transmitted but has been allocated with an SN, use the reset compressor to perform recompression, use the updated encryption module to perform re-encryption to generate a new PDU; and use the newly generated PDU to replace a resident Data PDU, and deliver it to a lower layer.

Below further descriptions are given by using concrete application examples.

APPLICATION EXAMPLE 1

For a UM-type PDCP entity, a method of classified caching is adopted, that is, service messages are stored in a service message buffer zone, and control messages are stored in a control message buffer zone.

On the receiving side, the following steps are included:

1.1 during reestablishment at the UM-type PDCP layer, the control message buffer zone on the receiving side is released, and all feedback-type control messages therein are cleared;

1.2 when the reestablishment occurs, messages in the service message buffer zone on the receiving side are processed to generate a PDCP SDU;

1.3 all feedback information generated in step 1.2 is filtered to avoid being encapsulated on the transmitting side;

1.4 the PDCP SDU is delivered to an upper layer;

1.5 steps 1.2-1.4 are repeated until all the messages in the service message buffer zone on the receiving side are processed; and 1.6 a security configuration of the decryption module is updated (such as change a password) and the decompressor is reset so as to return to the initial state and operating mode.

On the transmitting side, the following steps are included:

1.a during reestablishment at the UM-type PDCP layer, a configuration of the encryption module on the transmitting side is updated, and the compressor is reset so as to return to the initial state and operating mode;

1.b the control message buffer zone on the transmitting side is released, and all the feedback-type control messages therein are cleared;

1.c an SDU which is not successfully transmitted but has been allocated with an SN is allocated with a new SN starting from 0, the new SN is adapted to encapsulate a packet header, the reset compressor and encryption module are adapted to recompression and re-encryption to generate a new PDU;

1.d the newly generated PDU is adapted to replace a resident Data PDU and delivered to a lower layer; and 1.e steps 1.c-1.d are repeated until all the messages in the service message buffer zone on the transmitting side are processed.

APPLICATION EXAMPLE 2

For an AM-type PDCP entity, the method of classified caching is adopted, that is service message are stored in the service message buffer zone, and control messages are stored in the control message buffer zone.

On the receiving side, the following steps are included:

2.1 during reestablishment at the AM-type PDCP layer, the control message buffer zone on the receiving side is released, and all feedback-type control messages and status report-type control messages therein are cleared;

2.2 when the reestablishment occurs, messages in the service message buffer zone on the receiving side are processed to generate a PDCP SDU;

2.3 all feedback information generated in step 2.2 is filtered to avoid being encapsulated on the transmitting side;

2.4 PDCP SDUs with continuous SNs are delivered to an upper layer, and PDCP SDUs with message cavity, i.e. with discontinuous SNs are cached;

2.5 steps 2.2-2.4 are repeated until all the messages in the service message buffer zone on the receiving side are processed; and 2.6 a security configuration of the decryption module is updated (such as changing a password) and the decompressor is reset so as to return to the initial state and operating mode.

On the transmitting side, the following steps are included:

2.a during reestablishment at the AM-type PDCP layer, a configuration of the encryption module on the transmitting side is updated, and the compressor is reset so as to return to the initial state and operating mode;

2.b the control message buffer zone on the transmitting side is released, and all feedback-type control messages and status report-type control messages therein are cleared;

2.c for an SDU which is not successfully transmitted but has been allocated with SN, an original SN is adapted to encapsulate a packet header, the reset compressor and encryptor are used for recompression and re-encryption to generate a new PDU;

2.d the newly generated PDU is adapted to replace a resident Data PDU and delivered to a lower layer; and 2.e steps 2.c-2.d are repeated until all the messages on the transmitting side which are not successfully transmitted are processed.

APPLICATION EXAMPLE 3

For reestablishment at the UM-type PDCP layer, a method of mixed buffering plus message filtering is adopted, that is, control messages and service messages are stored in a mixed buffer zone.

On the receiving side, the following steps are included:

3.1 during reestablishment at the UM-type PDCP layer, a filter for feedback messages of Type 1 is effective and filters resident messages in the mixed buffer zone on the receiving side, and the resident feedback messages of Type 1 are cleared;

3.2 service messages passing the filter are unpacked, decrypted, and decompressed sequentially to generate a PDCP SDU;

3.3 when the reestablishment occurs, a filter for feedback messages of Type 2 is effective and filters feedback information of Type 2 generated in step 3.2 to avoid such information being encapsulated on the transmitting side;

3.4 the PDCP SDU is delivered to an upper layer;

3.5 steps 3.1-3.4 are repeated until all the messages on the receiving side are processed;

3.6 a security configuration of the decryption module is updated (such as changing a password) and the decompressor is reset so as to return to the initial state and operating mode.

On the transmitting side, the following steps are included:

3.a when reestablishment at the UM-type PDCP layer happens, a configuration of the encryption module on the transmitting side is updated, and the compressor is reset so as to return to the initial state and operating mode;

3.b when the reestablishment happens, feedback control messages of Type 3 residing in the mixed buffer zone on the transmitting side are cleared;

3.c an SDU which is not successfully transmitted but has been allocated with an SN is allocated with a new SN starting from 0, the new SN is adapted to encapsulate a packet header, the reset compressor and encryptor are used for recompression and re-encryption to generate a new PDU;

3.d the newly generated PDU is adapted to replace a resident Data PDU and delivered to a lower layer; and 3.e steps 3.c-3.d are repeated until all the service messages on the transmitting side which are not successfully transmitted are processed.

APPLICATION EXAMPLE 4

For reestablishment at the AM-type PDCP layer, the method of mixed buffer plus message filtering is adopted, that is, control messages and service messages are stored in a mixed buffer zone.

On the receiving side, the following steps are included:

4.1 when reestablishment at AM-type PDCP layer happens, a filter for feedback messages of Type 1 is effective and filters resident messages in the mixed buffer zone on the receiving side, and the resident feedback messages of Type 1 and status reports of Type 1 are cleared;

4.2 service messages passing the filter are unpacked, decrypted, and decompressed sequentially to generate a PDCP SDU;

4.3 when the reestablishment happens, a filter for feedback messages of Type 2 is effective and filters feedback information of Type 2 generated in step 4.2 to avoid such information being encapsulated on the transmitting side;

4.4 PDCP SDUs with continuous SNs are delivered to an upper layer, and PDCP SDUs with message cavity, i.e. with discontinuous SNs, are cached;

4.5 steps 4.1-4.4, are repeated until all the messages on the receiving side are processed; and 4.6 a security configuration of the decryption module is updated (such as changing a password) and the decompressor is reset so as to return to the initial state and operating mode.

On the transmitting side, the following steps are included:

4.a when reestablishment at the AM-type PDCP layer happens, a configuration of the encryption module on the transmitting side is updated, and the compressor is reset so as to return to the initial state and operating mode;

4.b when the reestablishment occurs, resident feedback control messages of Type 3 and status report control messages of Type 2 in the mixed buffer zone on the transmitting side are cleared;

4.c for an SDU which is not successfully transmitted but has been allocated with an SN, an original SN is adapted to encapsulate a packet header, the reset compressor and encryptor are used for recompression and re-encryption to generate a new PDU;

4.d the newly generated PDU is adapted to replace a resident Data PDU and delivered to a lower layer; and 4.e steps 4.c-4.d are repeated until all the service messages on the transmitting side which are not successfully transmitted are processed.

With the differentiated processing of resident messages at a PDCP layer during reestablishment, the present invention can effectively reduce the possibility of abnormal mode switching of a compressor, thus avoiding the delay of message processing after the reestablishment. Meanwhile, the present invention can avoid continued transmission of an invalid feedback after the reestablishment, thus improving the utilization of air interface resources.

The optimized method for reestablishment at the PDCP layer as described in the present invention is not limited to the applications described in the specification and embodiments and absolutely can be applied to all the fields suitable for the present invention. Those skilled in the art can easily realize other advantages and modifications. Therefore, without departing from the spirit and principle of the general concepts defined in the claims and identical scope, the present invention is not limited to specific details, representative devices and graphical examples given or described here.

INDUSTRIAL APPLICABILITY

With the differentiated processing of resident messages at a PDCP layer during reestablishment, the present invention can avoid abnormal mode switching of a compressor, and accelerate user plane restoration after the reestablishment. The invention can further avoid transmission of an invalid feedback, thus improving the utilization of air interface resources; meanwhile, by avoiding the influence of an invalid status report on uplink and downlink transmission policies, the present invention can reduce retransmission of service messages, thus improving the utilization of air interface resources.

The invention claimed is:

1. A method for reestablishment at a Packet Data Convergence Protocol (PDCP) layer, comprising
   on a receiving side of the PDCP layer:
   clearing resident control messages;
   processing resident service messages, and clearing feedback information generated during the processing; and, resetting a decompressor, and updating configuration of a decryption module;
   wherein if a Radio Link Control (RLC) layer to which the PDCP layer corresponds is in an Unacknowledged Mode (UM),
   resident messages on the receiving side are classified before the step of clearing resident control messages, and feedback-type control messages are discarded in the step of clearing resident control messages;
   in the step of processing resident service messages, the resident service messages are unpacked, decrypted and decompressed to generate a PDCP Service Data Unit (SDU), and the Service Data Unit SDU is delivered to an upper layer; and feedback information generated during the processing of the service messages is discarded in the step of clearing feedback information generated during the processing; and
   a security configuration of the decryption module is updated in the step of updating a configuration of a decryption module;
   if an RLC layer to which the PDCP layer corresponds is in an Acknowledged Mode (AM), resident messages on the receiving side are classified before the step of clearing resident control messages, and feedback-type control messages and status report-type control messages are discarded in the step of clearing resident control messages;

in the step of processing resident service messages, the resident service messages are unpacked, decrypted and decompressed to generate a PDCP SDU, PDCP SDUs with continuous serial number SNs are transmitted to an upper layer, and PDCP SDUs with discontinuous SNs are cached and not processed until the reestablishment is finished; and feedback information generated during the processing of the service messages is discarded; and a security configuration of the decryption module is updated in the step of updating a configuration of a decryption module; and on a transmitting side of the PDCP layer:

resetting a compressor, and updating configuration of an encryption module;

clearing resident control messages; and reprocessing resident service messages;

wherein if a Radio Link Control (RLC) layer to which the PDCP layer corresponds is in an Unacknowledged Mode (UM), resident messages on the transmitting side are classified before the step of clearing resident control messages, and feedback-type control messages are discarded in the step of clearing resident control messages; and in the step of reprocessing resident service messages, an SDU which is not successfully transmitted but has been allocated with an SN is allocated with a new SN starting from 0, the new SN is adapted to encapsulate a packet header, the reset compressor is used for recompression and the updated encryption module is used for re-encryption to generate a new Protocol Data Unit (PDU); and the newly generated PDU is adapted to replace a resident Data PDU and delivered to a lower layer;

if an RLC layer to which the PDCP layer corresponds is in an Acknowledged Mode (AM), resident messages on the transmitting side are classified before the step of clearing resident control messages, and feedback-type control messages and status report-type control messages are discarded in the step of clearing resident control messages; and in the step of reprocessing resident service messages, for an SDU which is not successfully transmitted but has been allocated with an SN, an original SN is adapted to encapsulate a packet header, the reset compressor is used for recompression and the updated encryption module is used for re-encryption to generate a new PDU; and the newly generated PDU is adapted to replace a resident Data PDU and delivered to a lower layer.

2. A method for reestablishment at a Packet Data Convergence Protocol (PDCP) layer, which is applied to a receiving side of the PDCP layer, comprising:

clearing resident control messages;

processing resident service messages, and clearing feedback information generated during the processing; and resetting a decompressor, and updating a configuration of a decryption module;

wherein if a Radio Link Control (RLC) layer to which the PDCP layer corresponds is in an Unacknowledged Mode (UM), resident messages on the receiving side are classified before the step of clearing resident control messages, and feedback-type control messages are discarded in the step of clearing resident control messages;

in the step of processing resident service messages, the resident service messages are unpacked, decrypted and decompressed to generate a PDCP Service Data Unit (SDU), and the SDU is delivered to an upper layer; and feedback information generated during the processing of the service messages is discarded in the step of clearing feedback information generated during the processing; and a security configuration of the decryption module is updated in the step of updating a configuration of a decryption module;

if an RLC layer to which the PDCP layer corresponds is in an Acknowledged Mode (AM), resident messages on the receiving side are classified before the step of clearing resident control messages, and feedback-type control messages and status report-type control messages are discarded in the step of clearing resident control messages;

in the step of processing resident service messages, the resident service messages are unpacked, decrypted and decompressed to generate a PDCP SDU, PDCP SDUs with continuous SNs are transmitted to an upper layer, and PDCP SDUs with discontinuous SNs are cached and not processed until the reestablishment is finished; and feedback information generated during the processing of the service messages is discarded; and a security configuration of the decryption module is updated in the step of updating a configuration of a decryption module.

3. A method for reestablishment at a Packet Data Convergence Protocol (PDCP) layer, which is applied to a transmitting side of the PDCP layer, comprising:

resetting a compressor, and updating a configuration of an encryption module;

clearing resident control messages; and reprocessing resident service messages;

wherein if a Radio Link Control (RLC) layer to which the PDCP layer corresponds is in an Unacknowledged Mode (UM), resident messages on the transmitting side are classified before the step of clearing resident control messages, and feedback-type control messages are discarded in the step of clearing resident control messages; and in the step of reprocessing resident service messages, an Service Data Unit SDU which is not successfully transmitted but has been allocated with an serial number SN is allocated with a new SN starting from 0, the new SN is adapted to encapsulate a packet header, the reset compressor is used for recompression and the updated encryption module is used for re-encryption to generate a new Protocol Data Unit (PDU); and the newly generated PDU is adapted to replace a resident Data PDU and delivered to a lower layer;

if an RLC layer to which the PDCP layer corresponds is in an Acknowledged Mode (AM), resident messages on the transmitting side are classified before the step of clearing resident control messages, and feedback-type control messages and status report-type control messages are discarded in the step of clearing resident control messages; and in the step of reprocessing resident service messages, for an SDU which is not successfully transmitted but has been allocated with an SN, an original SN is adapted to encapsulate a packet header, the reset compressor is used for recompression and the updated encryption module is used for re-encryption to generate a new PDU; and the newly generated PDU is adapted to replace a resident Data PDU and delivered to a lower layer.

4. A device for reestablishment at a Packet Data Convergence Protocol (PDCP) layer, comprising a receiver and a transmitter, wherein the receiver is configured to clear resident control messages during the reestablishment at the PDCP layer, process resident service messages and clear feedback information generated during the processing;

wherein if a Radio Link Control (RLC) layer to which the PDCP layer corresponds is in an Unacknowledged Mode (UM), during the reestablishment at the PDCP layer, the receiver is configured to classify resident messages, discard feedback-type control messages, unpack, decrypt and decompress resident service messages to generate a PDCP Service Data Unit SDU, deliver the SDU to an upper layer, discard feedback information generated during processing of the service messages, and reset a decompressor and update a security configuration of a decryption module after processing of the resident messages is completed;

if an RLC layer to which the PDCP layer corresponds is in an Acknowledged Mode (AM), during the reestablishment at the PDCP layer, the receiver is configured to classify resident messages, discard feedback-type control messages and status report-type control messages, unpack, decrypt and decompress resident service messages to generate a PDCP SDU, deliver PDCP SDUs with continuous serial number SNs to an upper layer, cache PDCP SDUs with discontinuous SNs and not process them until the reestablishment is finished, discard feedback information generated during the processing of the service messages, and reset a decompressor and update a security configuration of a decryption module after processing of the resident messages is completed; and the transmitter is configured to clear resident control messages during the reestablishment at the PDCP layer;

wherein if a Radio Link Control (RLC) layer to which the PDCP layer corresponds is in an Unacknowledged Mode (UM), during the reestablishment at the PDCP layer, the transmitter is configured to reset a compressor, update a configuration of an encryption module, classify resident messages, discard feedback-type control messages, allocate a new SN starting from 0 to an SDU which is not successfully transmitted but has been allocated with an SN, use the new SN to encapsulate a packet header, use the reset compressor to perform recompression and use the updated encryption module to perform re-encryption to generate a new PDU, and use the newly generated PDU to replace a resident Data PDU, and deliver it to a lower layer;

if an RLC layer to which the PDCP layer corresponds is in an Acknowledged Mode (AM), during the reestablishment at the PDCP layer, the transmitter is configured to reset a compressor, update a configuration of an encryption module, classify resident messages, discard feedback-type control messages and status report-type control messages, use an original SN to encapsulate a packet header for an SDU which is not successfully transmitted but has been allocated with an SN, use the reset compressor to perform recompression and use the updated encryption module to perform re-encryption to generate a new PDU, and use the newly generated PDU to replace a resident Data PDU, and deliver it to a lower layer.

5. A receiver in a device for reestablishment at a Packet Data Convergence Protocol (PDCP) layer, being configured to clear resident control messages during the reestablishment at the PDCP layer, process resident service messages and clear feedback information generated during the processing;

wherein if a Radio Link Control (RLC) layer to which the PDCP layer corresponds is in an Unacknowledged Mode (UM), during the reestablishment at the PDCP layer, the receiver is configured to classify resident messages, discard feedback-type control messages, unpack, decrypt and decompress resident service messages to generate a PDCP Service Data Unit SDU, deliver the SDU to an upper layer, discard feedback information generated during processing of the service messages, and reset a decompressor and update a security configuration of a decryption module after processing of the resident messages is completed;

if an RLC layer to which the PDCP layer corresponds is in an Acknowledged Mode (AM), during the reestablishment at the PDCP layer, the receiver is configured to classify resident messages, discard feedback-type control messages and status report-type control messages, unpack, decrypt and decompress resident service messages to generate a PDCP SDU, deliver PDCP SDUs with continuous serial number SNs to an upper layer, cache PDCP SDUs with discontinuous SNs and not process them until the reestablishment is finished, discard feedback information generated during the processing of the service messages, and reset a decompressor and update a security configuration of a decryption module after processing of the resident messages is completed.

6. A transmitter in a device for reestablishment at a Packet Data Convergence Protocol (PDCP) layer, being configured to clear resident control messages during the reestablishment at the PDCP layer, wherein if a Radio Link Control (RLC) layer to which the PDCP layer corresponds is in an Unacknowledged Mode (UM), during the reestablishment at the PDCP layer, the transmitter is configured to reset a compressor, update a configuration of an encryption module, classify resident messages, discard feedback-type control messages, allocate a new serial number SN starting from 0 to an Service Data Unit SDU which is not successfully transmitted but has been allocated with an SN, use the new SN to encapsulate a packet header, use the reset compressor to perform recompression and use the updated encryption module to perform re-encryption to generate a new PDU, and use the newly generated PDU to replace a resident Data PDU, and deliver it to a lower layer;

if an RLC layer to which the PDCP layer corresponds is in an Acknowledged Mode (AM), during the reestablishment at the PDCP layer, the transmitter is configured to reset a compressor, update a configuration of an encryption module, classify resident messages, discard feedback-type control messages and status report-type control messages, use an original SN to encapsulate a packet header for an SDU which is not successfully transmitted but has been allocated with an SN, use the reset compressor to perform recompression and use the updated encryption module to perform re-encryption to generate a new PDU, and use the newly generated PDU to replace a resident Data PDU, and deliver it to a lower layer.

* * * * *